(12) United States Patent
Tamir et al.

(10) Patent No.: US 11,632,489 B2
(45) Date of Patent: Apr. 18, 2023

(54) SYSTEM AND METHOD FOR RENDERING FREE VIEWPOINT VIDEO FOR STUDIO APPLICATIONS

(71) Applicant: Tetavi Ltd., Petach Tiqva (IL)

(72) Inventors: Michael Tamir, Tel Aviv (IL); Michael Birnboim, Holon (IL); David Dreizner, Raanana (IL); Michael Priven, Ramat-Gan (IL); Vsevolod Kagarlitsky, Ramat Gan (IL)

(73) Assignee: TETAVI, LTD., Ramat Gan (IL)

( * ) Notice: Subject to any disclaimer, the term of this patent is extended or adjusted under 35 U.S.C. 154(b) by 9 days.

(21) Appl. No.: 15/882,644

(22) Filed: Jan. 29, 2018

(65) Prior Publication Data

US 2018/0220048 A1 Aug. 2, 2018

Related U.S. Application Data

(60) Provisional application No. 62/452,694, filed on Jan. 31, 2017.

(51) Int. Cl.
*H04N 5/222* (2006.01)
*G06T 15/04* (2011.01)
(Continued)

(52) U.S. Cl.
CPC ........... *H04N 5/2226* (2013.01); *G01B 11/00* (2013.01); *G01B 11/25* (2013.01); *G06T 15/04* (2013.01);
(Continued)

(58) Field of Classification Search
CPC ......... G01B 11/00; G01B 11/25; G06T 15/04; G06T 17/00; G06T 17/20; G06T 19/003;
(Continued)

(56) References Cited

U.S. PATENT DOCUMENTS 4,695,878 A 9/1987 Levine et al.
5,206,697 A 4/1993 Schwartz
(Continued)

OTHER PUBLICATIONS

Solony et al.; Scene Reconstruction From Kinect Motion; 2011; electroscope; pp. 1-5.*
(Continued)

*Primary Examiner* — Peter D Le
(74) *Attorney, Agent, or Firm* — M&B IP Analysts, LLC

(57) ABSTRACT

Systems and methods for foreground/background separation and for studio production of a FVV. A method includes projecting, onto objects in a filming area within a studio, a predefined pattern including a large set of features; generating, based on signals reflected off of the objects and captured by a plurality of depth cameras deployed in proximity to the filming area, a local point cloud for each depth camera; separating, based on the local point clouds, between a background and a foreground of the filming area; creating, based on the local point clouds, a unified point cloud; meshing points in the unified point cloud to generate a 3D model of the objects; texturing the 3D model based on the separation and images captured by the depth cameras; and rendering the textured 3D model as a FVV including a series of video frames with respect to at least one viewpoint.

27 Claims, 11 Drawing Sheets

(51) Int. Cl.
*G06T 17/20* (2006.01)
*H04N 13/271* (2018.01)
*H04N 13/279* (2018.01)
*H04N 13/282* (2018.01)
*G01B 11/00* (2006.01)
*G06T 17/00* (2006.01)
*G01B 11/25* (2006.01)
*H04N 13/257* (2018.01)
*H04N 13/25* (2018.01)
*G06T 19/00* (2011.01)

(52) U.S. Cl.
CPC ............. *G06T 17/00* (2013.01); *G06T 17/20* (2013.01); *G06T 19/003* (2013.01); *H04N 13/25* (2018.05); *H04N 13/257* (2018.05); *H04N 13/271* (2018.05); *H04N 13/279* (2018.05); *H04N 13/282* (2018.05); *G06T 2210/56* (2013.01)

(58) Field of Classification Search
CPC .. G06T 2210/56; H04N 13/25; H04N 13/257; H04N 13/271; H04N 13/279; H04N 13/282; H04N 5/2226
See application file for complete search history.

(56) References Cited

U.S. PATENT DOCUMENTS

| | | | | |
|---|---|---|---|---|
| 5,535,288 | A * | 7/1996 | Chen | G06F 15/7857 348/E5.066 |
| 5,993,318 | A | 11/1999 | Kousaki | |
| 6,055,330 | A * | 4/2000 | Eleftheriadis | G06T 9/007 382/154 |
| 8,051,452 | B2 | 11/2011 | Arseneau et al. | |
| 8,391,773 | B2 | 3/2013 | Arseneau et al. | |
| 8,723,956 | B2 * | 5/2014 | Anderson | H04N 5/222 348/157 |
| 8,803,951 | B2 * | 8/2014 | Gay | G06T 19/006 348/47 |
| 8,917,270 | B2 | 12/2014 | Sweeney et al. | |
| 9,077,866 | B2 * | 7/2015 | Aagaard | H04N 7/181 |
| 2003/0012277 | A1 * | 1/2003 | Azuma | G06T 7/70 375/240.08 |
| 2004/0062450 | A1 * | 4/2004 | Kondo | H04N 5/272 382/266 |
| 2005/0018045 | A1 * | 1/2005 | Thomas | G06K 9/209 348/157 |
| 2005/0057663 | A1 * | 3/2005 | Thomas | H04N 5/275 348/222.1 |
| 2005/0285874 | A1 * | 12/2005 | Zitnick | G06T 15/205 345/592 |
| 2006/0017835 | A1 * | 1/2006 | Jacobsen | H04N 19/115 348/345 |
| 2006/0221072 | A1 * | 10/2006 | Se | G01C 11/06 345/420 |
| 2007/0279494 | A1 * | 12/2007 | Aman | G01S 3/7864 348/169 |
| 2008/0118143 | A1 | 5/2008 | Gordon et al. | |
| 2008/0192116 | A1 * | 8/2008 | Tamir | G06T 7/292 348/157 |
| 2009/0109280 | A1 | 4/2009 | Gotsman et al. | |
| 2009/0167930 | A1 * | 7/2009 | Safaee-Rad | G02B 7/38 348/347 |
| 2009/0172606 | A1 * | 7/2009 | Dunn | G06F 3/017 715/863 |
| 2009/0244062 | A1 * | 10/2009 | Steedly | G06T 15/205 345/420 |
| 2009/0297061 | A1 * | 12/2009 | Mareachen | H04N 19/167 382/285 |
| 2010/0014781 | A1 * | 1/2010 | Liu | H04N 13/261 382/285 |
| 2010/0200752 | A1 | 8/2010 | Lee et al. | |
| 2011/0128286 | A1 * | 6/2011 | Park | G06T 17/00 345/424 |
| 2012/0230545 | A1 * | 9/2012 | Zhang | G06K 9/00221 382/103 |
| 2012/0249802 | A1 * | 10/2012 | Taylor | G06T 7/292 348/169 |
| 2013/0095459 | A1 * | 4/2013 | Tran | G06F 19/3475 434/247 |
| 2013/0095920 | A1 | 4/2013 | Patiejunas et al. | |
| 2013/0147785 | A1 | 6/2013 | Patiejunas et al. | |
| 2013/0222369 | A1 * | 8/2013 | Huston | G06T 17/00 345/419 |
| 2013/0321393 | A1 | 12/2013 | Winder | |
| 2013/0321396 | A1 | 12/2013 | Kirk et al. | |
| 2013/0321586 | A1 | 12/2013 | Kirk et al. | |
| 2013/0321593 | A1 | 12/2013 | Kirk et al. | |
| 2013/0329985 | A1 * | 12/2013 | Helin | H04N 13/111 382/154 |
| 2014/0118482 | A1 * | 5/2014 | Noh | H04N 5/23238 348/36 |
| 2014/0176535 | A1 * | 6/2014 | Krig | G06T 15/04 345/419 |
| 2014/0232820 | A1 * | 8/2014 | Ha | G06T 3/40 348/43 |
| 2014/0340404 | A1 * | 11/2014 | Wang | G06T 15/20 345/427 |
| 2015/0123973 | A1 * | 5/2015 | Larsen | G06T 15/04 345/427 |
| 2015/0243073 | A1 * | 8/2015 | Chen | G06T 17/05 345/419 |
| 2015/0279044 | A1 * | 10/2015 | Kim | G06K 9/00268 345/419 |
| 2015/0323672 | A1 * | 11/2015 | Shen | G01S 17/023 382/154 |
| 2016/0234475 | A1 * | 8/2016 | Courchesne | H04N 7/157 |
| 2017/0046833 | A1 * | 2/2017 | Lurie | G06T 19/20 |
| 2017/0099441 | A1 * | 4/2017 | Choi | H04N 5/247 |
| 2017/0154433 | A1 * | 6/2017 | Takakura | G06T 7/55 |
| 2017/0157512 | A1 * | 6/2017 | Long | A63F 13/497 |
| 2017/0270654 | A1 | 9/2017 | Eldar | |
| 2017/0316606 | A1 | 11/2017 | Khalid et al. | |
| 2018/0005079 | A1 | 1/2018 | Tosic et al. | |

OTHER PUBLICATIONS

Collet, et al., "Highly Quality Streamable Free-Viewpoint Video", 34 ACM Transactions on Graphics 4, 2015.
Holoportation, Microsoft Research, https://www.microsoft.com/en-us/research/project/holoportation-3/, last accessed on Jan. 29, 2018.
SWIR Area Cameras, Sensors Unlimited, http://www.sensorsinc.com/products/area-cameras, last accessed Jan. 29, 2018.
Taylor, et al., "Efficient and Precise Interactive Hand Tracking Through Joint, Continuous Optimization of Pose and Correspondences", SIGGRAPH 2016, Anaheim, California, Jul. 2016, pp. 1-12.
Solony, et al., "Scene Reconstrcution From Kinect Motion," 2011, Electroscope, pp. 1-5.

* cited by examiner

SYSTEM AND METHOD FOR RENDERING FREE VIEWPOINT VIDEO FOR STUDIO APPLICATIONS

CROSS-REFERENCE TO RELATED APPLICATIONS

This application claims the benefit of U.S. Provisional Application No. 62/452,694 filed on Jan. 31, 2017, the contents of which are hereby incorporated by reference.

TECHNICAL FIELD

The present disclosure generally relates to capturing, recording, streaming and displaying free viewpoint videos.

BACKGROUND

Free viewpoint video (FVV) is a designation for the capability of a rendering engine to interactively control the viewpoint while rendering and displaying a video signal. FVV represents one of the most exciting applications of next-generation television, adding a further degree of freedom to the usual way of watching television.

Movies production, television and internet studios often use moveable passive cameras to record and/or broadcast live content. Such passive cameras are standard video cameras that do not transmit radiation or otherwise actively measure distances to targets. The studio cameras are, in many cases, moved not just in the pan and tilt axes but also in translation in order to capture different perspectives such as, for example, a bird's eye view, an opposite side view and the like.

A passive camera is typically controlled either remotely or directly, by a human operator who aims the camera at interesting activities and captures video of the event. The operator may move the passive camera using rigs such as dollies, cranes, both, and the like. Such devices can be expensive to purchase, require maintenance, occupy space, cannot reach all relevant viewpoints, and typically can only be operated by trained operators. Thus, the costs of using traditional passive cameras and their human operators may be prohibitive.

For broadcasts requiring high quality production (e.g., a high budget television show or movie), high quality passive cameras must be used. The combination of the high number of expensive cameras and the human-operated rigs inevitably results in costly and logistically complicated studio broadcast production. Additionally, not all desired viewpoints are reachable using off the shelf rigs.

Existing solutions allow directors to select from video captured by different cameras in order to provide footage from a variety of viewing perspectives. Consequently, directors may only select among footage captured from viewpoints chosen or otherwise used by the operator or cameraman. Thus, operators or cameramen must provide suitable viewpoints, which may require advanced planning of camera positions and angles, use of multiple cameras, reshooting footage, or a combination thereof. These limitations may be overly cumbersome, particularly for lower budget or tight schedule productions as is typical for television and internet broadcasts.

Additionally, modern audiences demand higher quality viewing than ever before, including more perspectives and viewing options. This demand for high quality viewing extends to live studio productions such as news programs, live broadcasts of reality shows, games, and the like. Such demands impose strict quality requirements on the FVV generated when depth cameras are used to produce the studio video. This level of quality is challenging due to time, processing, memory, and communication constraints.

Further, many videos recorded in studios require substitution of backgrounds and integration with 3D computer generated environments. To this end, chroma keying may be used during the live action or in post production to allow for insertion of a separately filmed background or 3D graphical scene. For example, a scene may be filmed using a green screen or a blue screen in the studio, where the green or blue screen is replaced live or during editing with other footage or graphics. Although these solutions allow for substitution of background scenery, using a blue screen or green screen may be inconvenient and add costs to production.

More specifically, use of a blue or green screen requires excluding objects of that color from recording, thereby restricting its use based on colors of objects being recorded. Accordingly, colors of objects in the studio cannot match the color of the screen used for chromakeying or the objects will be substituted out during editing. Thus, the studio itself must be designed to avoid potential chromakeying colors (i.e., the studio may be designed to exclude objects in the blue or green shades). Additionally, persons being filmed must not wear clothing having colors that match the color of the screen being used. This restricts clothing options for hosts of productions, and may require guests to change their clothing before filming.

Also, as the blue or green screen must remain in the background, movement of the cameras is typically restricted (either the cameras are not moved or are only moved in a limited fashion). This may be incompatible with some virtual studios in which cameras are moved in 3 or 6 degrees of freedom. Thus, existing solutions face challenges in providing chromakeying for productions requiring multiple different angles. As a result, many broadcasts using chromakeying to substitute backgrounds are filmed only from one viewpoint (i.e., in front of the studio facing directly at the center of the studio).

Additionally, following the successful launch of various virtual reality (VR) and augmented reality (AR) programs, a need for producing footage useful for AR and VR applications arose. Specifically, an AR or VR headset allows a user to move his or her head freely in six degrees of freedom and walk around, thereby triggering displays of new objects.

Some existing solutions provide cameras for capturing 180 or 360-degree panoramic videos. However, these panoramic cameras must be placed at the center of a filming area. As a result, images captured by these cameras only show an inside-to-outside view of the filming area, i.e., the video only shows a viewpoint from the center of the filming area looking outward. Such an "inside-out" view does not provide a "true" AR or VR experience from viewpoints that the user may occupy.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for studio production of a free viewpoint video (FVV), comprising: projecting, onto objects in a filming area within a studio, a predefined pattern including a large set of features; generating, based on signals captured by each of a plurality of depth cameras, a local point cloud for each depth camera, wherein the plurality of depth cameras is deployed in proximity to the filming area, wherein the captured signals are reflected off of the objects within the filming area; separating, based on the plurality of local point clouds, between a background and a foreground of the filming area of the studio; creating, based on the plurality of local point clouds, a unified point cloud; meshing points in the unified point cloud to generate a three-dimensional (3D) model of the objects; texturing the 3D model based on the separation and images captured by the plurality of depth cameras; and rendering the textured 3D model as a FVV including a series of video frames with respect to at least one viewpoint.

Certain embodiments disclosed herein also include a method for foreground/background video separation. The method comprises: projecting, onto objects in a filming area within a studio, a predefined pattern including a large set of features; generating, based on signals captured by each of a plurality of depth cameras, a local point cloud for each depth camera, wherein the plurality of depth cameras is deployed in proximity to the filming area, wherein the captured signals are reflected off of the objects within the filming area; separating, based on the plurality of local point clouds, between a background and a foreground of the filming area.

Certain embodiments disclosed herein also include a system for studio production of a free viewpoint video (FVV). The system comprises: a processing circuitry; and a memory, the memory containing instructions that, when executed by the processing circuitry, configure the system to: project, onto objects in a filming area within a studio, a predefined pattern including a large set of features; generate, based on signals captured by each of a plurality of depth cameras, a local point cloud for each depth camera, wherein the plurality of depth cameras is deployed in proximity to the filming area, wherein the captured signals are reflected off of the objects within the filming area; separate, based on the plurality of local point clouds, between a background and a foreground of the filming area of the studio; create, based on the plurality of local point clouds, a unified point cloud; mesh points in the unified point cloud to generate a three-dimensional (3D) model of the objects; texture the 3D model based on the separation and images captured by the plurality of depth cameras; and render the textured 3D model as a FVV including a series of video frames with respect to at least one viewpoint.

Certain embodiments disclosed herein also include a system for foreground/background video separation. The system comprises: a processing circuitry; and a memory, the memory containing instructions that, when executed by the processing circuitry, configure the system to: project, onto objects in a filming area within a studio, a predefined pattern including a large set of features; generate, based on signals captured by each of a plurality of depth cameras, a local point cloud for each depth camera, wherein the plurality of depth cameras is deployed in proximity to the filming area, wherein the captured signals are reflected off of the objects within the filming area; separate, based on the plurality of local point clouds, between a background and a foreground of the filming area.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
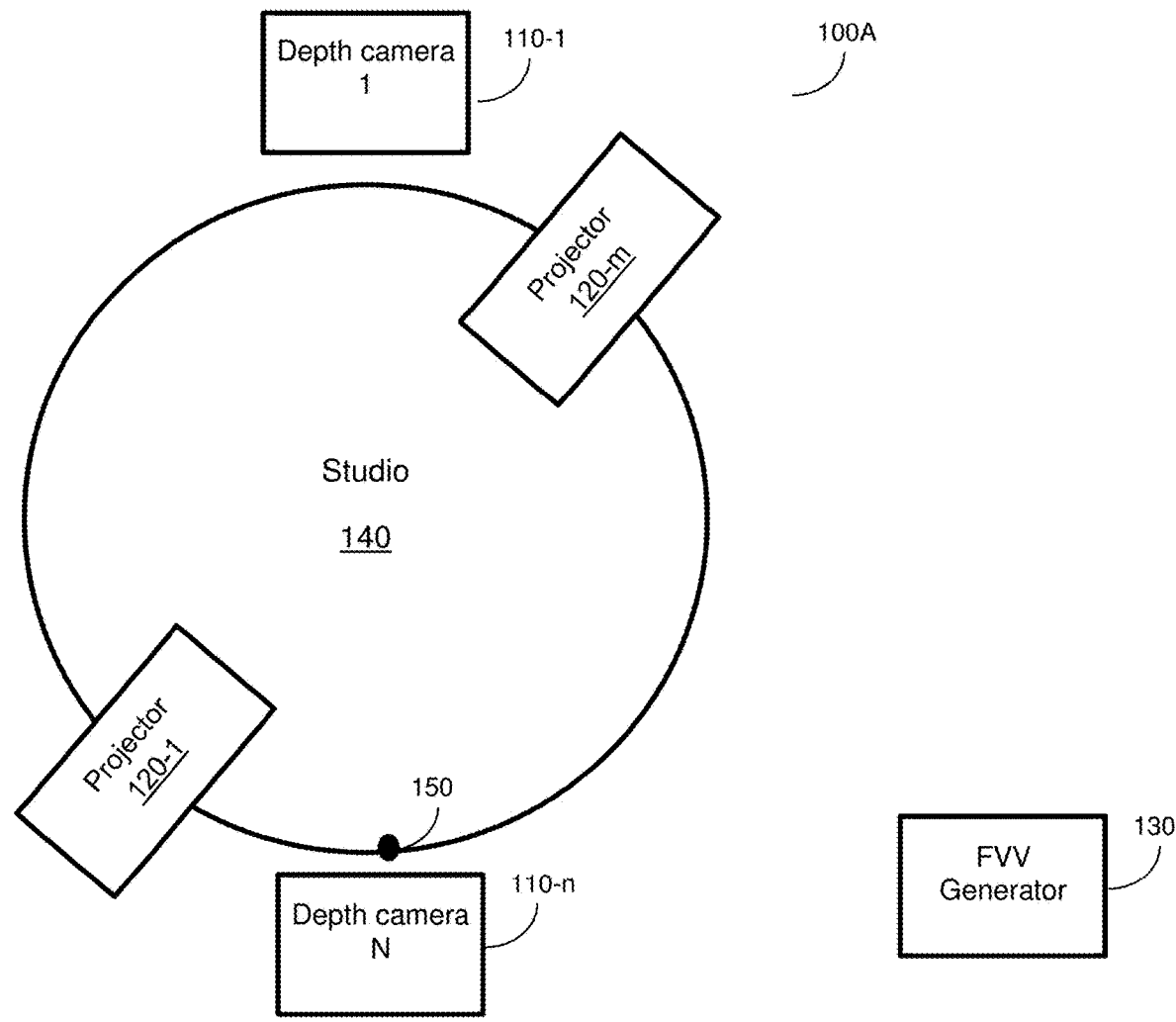
FIG. 1A is a schematic diagram illustrating an arrangement of depth cameras according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for generating high quality free viewpoint videos (FVVs) using a low number of depth cameras. The FVVs may be utilized for studio and movie applications. The disclosed embodiments further allow for real-time FVV processing and rendering of live events, volumetric videos, virtual reality videos, and the like, using a reduced number of cameras. Some disclosed embodiments further allow for improving range of depth cameras to allow for creating FVVs based on larger areas.

The depth cameras utilized in the rendering of the FVVs may be based on unstructured light principles. Invisible unstructured light, having a predefined pattern is projected onto the scene. The reflected signals are captured by the depth cameras and processed to render a dynamic three-dimensional (3D) model. The processing includes creating a point cloud, meshing to produce the 3D model, and texture mapping to "paint" the meshed 3D model. The arrangement of the depth cameras and the process for generating the 3D model are discussed in greater detail below. It should be noted that some implementations may utilize structured light with a single IR-sensitive camera or a time of flight (TOF) camera including an IR sensitive camera without departing from the scope of the disclosure.

In an embodiment, the generated dynamic volumetric video is rendered as a video from a user's desired viewpoint within a location. Thus, the disclosed embodiments allow for selecting among virtual cameras located within a filming location, where each virtual camera represents a viewpoint from which images could be captured in the filming location. The number of real depth cameras used is discrete, while the number of afforded virtual viewpoints is infinite. Accordingly, the disclosed techniques further allow for reducing operation costs when editing recorded content or when broadcasting a live event by utilizing virtual cameras that can be positioned anywhere at the discretion of a director.

The selection of viewpoints may be performed live or during post-processing after the footage is initially captured. Thus, the viewpoints may be selected by, for example, a director or editor without requiring filming at a specific position and angle. In other words, viewpoints that are not shown in footage directly captured by any of the depth cameras may be selected.

Further, the disclosed embodiments allow for the production of a "virtual studio" with no green or blue screens, which often limit production capabilities and present logistical problems. In such embodiments, the segmentation of foreground and background objects is done based on the location of each foreground/background pixel as measured using depth cameras and thus the problematic color segmentation is not required. It should be noted that the "background" may include objects in front of the foreground, or zone of interest, from the perspective of the depth camera(s), and that the background is not strictly limited to objects behind the foreground. Thus, objects both in front of and behind the objects of interest may be substituted with other video or a 3D environment rendered with respect to a given viewpoint without departing from the scope of the disclosure. The 3D environment may be, for example, a computer-generated 3D environment or another FVV (e.g., an FVV showing another studio).

The disclosed embodiments may also be utilized in augmented reality studios for production of augmented reality videos where moving 3D graphical objects or other FVVs are augmented into a real environment with moving people. To this end, it may be determined whether the graphics or FVVs to be augmented are closer to or further from the depth camera(s) than the real object, and an occlusion map may be generated based on the determination. The augmented reality videos may be produced based on the exact locations of real objects and participants in the studio. The proposed system produces dynamic FVV of the occurrences in a real studio.

The disclosed embodiments may also be utilized for a virtual reality (VR) or augmented reality (AR) movies production suite. Specifically, multiple viewpoints of a location may be provided instantaneously, thereby providing rendering of the location from the VR or AR user's perspective in real-time as the user moves and looks around the VR environment.

The disclosed embodiments may further be utilized in a motion capture studio. In a motion capture studio, actors in the studio are allowed to transfer movements of limbs to movements of virtual objects. The disclosed embodiments allow for capturing of gestures and movement passively without the need for markers on the players' joints as required by existing solutions. Such markers may add cost and increase use of computing resources.

The disclosed embodiments may also be utilized to produce "teleportation" video clips in which a person or occurrence is recorded in a first location. The footage from the first location may be utilized to create a FVV, and the FVV may be rendered in footage of a second location in real-time such that the person or occurrence appears to be in the second location. The first location FVV may be rendered at an appropriate angle with respect to the footage of the second location, for example, such that the FVV from the first location is at a viewpoint matching that of a camera at the second location that captured the second location footage. The result is a unified video in which one or more objects from the first location is shown in the footage from the second location. Specifically, the reduced time needed by the disclosed embodiments allows for providing 3D renders more quickly than existing solutions, thereby allowing for effective real-time volumetric video rendering. Further, the reduced number and quality of cameras allows for implementation of volumetric video communication systems in non-studio (e.g., home) settings.

Figure 1B:
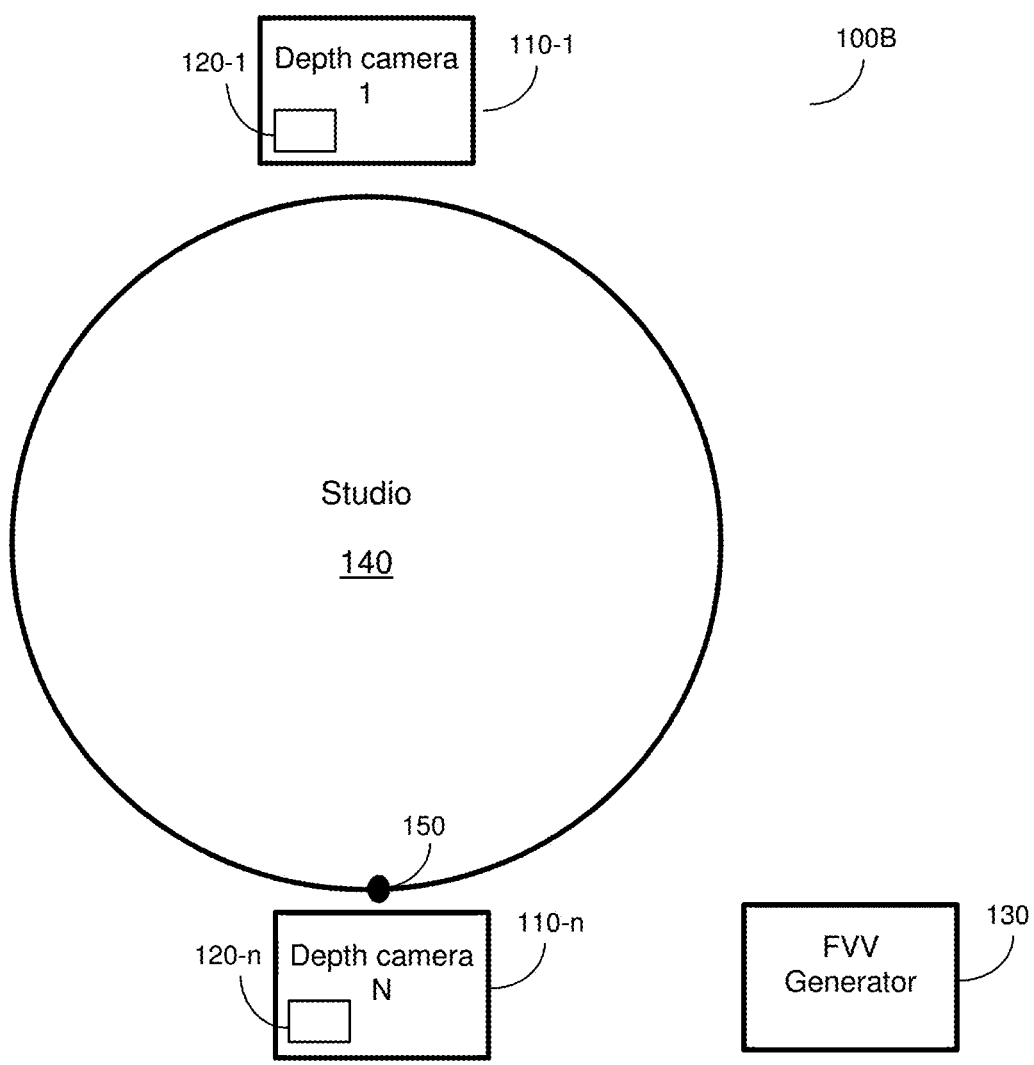
FIG. 1B is a schematic diagram illustrating another arrangement of depth cameras according to another embodiment.
Figure 1C:
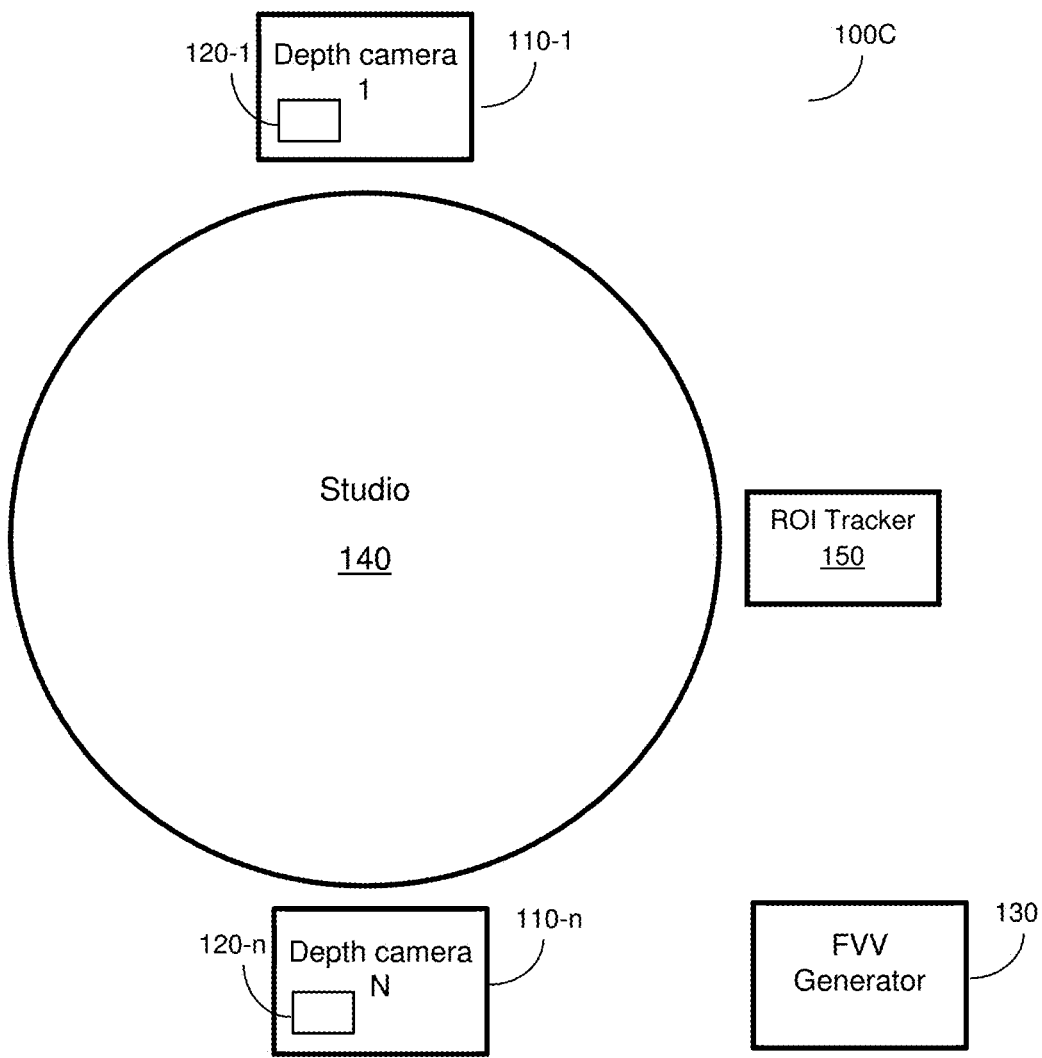
FIG. 1C is a schematic diagram illustrating another arrangement of depth cameras according to yet another embodiment.

FIGS. 1A-1C show example schematic diagrams 100A, 100B, and 100C illustrating example arrangements of a FVV rending system including depth cameras according to various disclosed embodiments. The schematic diagram 100A illustrates depth cameras 110-1 through 110-n, where "n" is an integer greater than or equal to 2 (hereinafter referred to individually as a depth camera 110 and collectively as depth cameras 110, merely for simplicity purposes), and projectors 120-1 and 120-m, where "m" is an integer greater than or equal to 1 (hereinafter referred to individually as a projector 120 and collectively as projectors 120, merely for simplicity purposes), deployed to capture video based on activities occurring in a studio 140. The images captured by the depth cameras 110 are provided to a FVV generator 130 for creation of FVVs. In an example embodiment, only one (1) depth camera can be utilized to generate the FVV.

The studio 140 may be, for example, a broadcast or Internet studio in which a program to be televised, delivered over the Internet, utilized to create a movie, or utilized for augmented reality or virtual reality applications, is recorded. Thus, the disclosed embodiments allow for FVV studio production without moving cameras, chromakeying, or both. Each of the projectors 120 is deployed in proximity to the studio 140 (i.e., in the studio 140 or within a threshold distance of the studio 140). The threshold distance may differ depending on, for example, a type and intensity of light emitted by the projectors 120, a configuration of the depth cameras 110, or both. The type of the depth cameras 110 being deployed are based on a maximum required range of the depth cameras 110 to the scene being filmed or recorded. Various examples are discussed below.

In the example and non-limiting arrangement shown in FIGS. 1A-1C, two depth cameras 100 are utilized, although one depth camera or more depth cameras may be utilized. In a further embodiment, three depth cameras 110 are utilized. Images captured by the depth cameras 110 are utilized to render a 3D model of the studio 140 and objects therein, thereby allowing for creating FVVs from the perspective of "virtual cameras" that may be located according to, for example, a director's or other user's discretion. Each virtual camera represents a perspective from in or around the studio 140, and may be associated with a viewpoint (i.e., a location and pose) capturing activities occurring in the studio 140.

Accordingly, footage from two to sixteen depth cameras may be utilized to effectively allow for an infinite number of virtual cameras.

Each depth camera 110 includes a RGB camera and a pair of black-and-white (B/W) cameras (not shown in FIG. 1). The RGB camera provides the three basic color components, i.e., red, green, blue. The B/W cameras are configured to detect light emitted by the projectors 120 and reflected from objects in the scene and each includes a spectral filter (not shown). The type of filter in each B/W camera depends on the type of light source of projectors 120 utilized. For example, filters used for near infrared laser or LEDs projectors transmit most of the reflected source infrared radiation and reject a portion of the ambient illumination thus increasing the signal to noise ratio in the cameras. In other example embodiments, each B/W camera may be configured with multiple types of filters including, but not limited to, an interference (dichroic) filter, a bandpass filter, a combination of short-pass and long-pass filters, and the like. In an example embodiment, the RGB and B/W cameras may be low resolution or otherwise low quality, inexpensive cameras.

In an embodiment, one or more projectors 120 are utilized. In the example implementation shown in FIG. 1A, the projectors 120 are deployed separately from the depth cameras 110 in proximity to the studio 140. In an alternative implementation shown in FIG. 1B, the depth cameras 110 may include the projectors 120.

Each projector 120 is utilized for producing local features with respect to the area of interest to facilitate the spatial correlation operation performed for the calculation of point clouds. That is, local features may be known patterns projected onto the surface of objects in the studio 140. To this end, each projector 120 is configured to project invisible light on objects in the studio 140. In an example embodiment, the light source of a projector 120 may be, but is not limited to, a laser (with an eye-safety mechanism or operating at an eye safe distance), a light-emitting diode (LED), or a standard projector lamp. The projected light is reflected off of the objects and captured by the B/W cameras included in the depth cameras 110, thereby allowing for determination of point clouds thereon.

Each projector 120 is typically located as close as possible to the areas that may be filmed within the studio 140 to increase the radiation intensity hitting the scene, thereby allowing for increased range of the depth cameras 110, i.e., further distance between each depth camera 110 and a far end of the studio 140 without an unsuitable drop in quality. In the example implementation shown in FIG. 1A, a point 150 of the studio 140 is located at the far end the depth camera 110-1.

In some arrangements, the type, number, or both, of the projectors 120 and, consequently, the filters used with the B/W cameras of the depth cameras 110, may depend on the filming location, i.e., the studio 140. That is, the type and number of projectors 120 may be based on the size of area for which FVVs are made such that projector configurations providing higher quality 3D models may be utilized for larger areas. The size may be with respect to a distance between each depth camera 110 and the far end of the studio (e.g., the far end 150 of the depth camera 110-1). Example implementations include using projectors based on LEDs for a distance between 2 and 20 meters to the far end of the studio. In order to further increase the range of the depth cameras, LIDAR scanners can be integrated in the depth cameras for a distance between 20 and 200 meters to the far end of the studio. For example, LIDAR scanners may be utilized to increase the range of the depth cameras when filming a movie at an outdoor location including a large filming area.

In some implementations, each of the projectors 120 may include an eye safe laser or LED source. In an embodiment, a laser emitting radiation in the 1.5-2 microns spectral band is used. Such laser is safe to the human eye and, thus, a much higher radiation intensity may be used to project the pattern without causing harm to humans in the studio 140. As such, the distance of the projector 120 and the depth cameras from the studio 140 can be increased. In such an implementation, the depth cameras 110 includes a pair of cameras (instead of the B/W cameras) sensitive to such spectral bands, for example InGaAs cameras with lenses adapted to this wavelength. Further, in some implementations, auto-tuning using other depth cameras 110 may be utilized to reduce the size of the field of view needed to be captured by each depth camera 110.

In some other implementations, each projector 120 utilizes an extended source of radiation. Use of an extended source in the visible or near infrared spectrum increases the minimum permissible energy on a human eye positioned at a distance from the projector 120. Thus, such a projector extends the eye safe distance and enables increasing the source intensity, and thus increased range of the depth cameras 110, i.e., further distance between each depth camera 110 and a far end of the studio 140 without an unsuitable drop in quality. As an example, such a distance may be up to 20 meters. In one example, the extended source is an array of LEDs at an extended source configuration.

FIG. 1C is an example schematic diagram 100C illustrating yet another implementation of the disclosed embodiments. In the example schematic diagram 100C, a Region of Interest (ROI) tracking module (ROI tracker) 150 is further located in proximity (e.g., within a threshold distance) to the studio 140. In this implementation, each depth camera 110 includes a LIDAR scanner, for example as shown in FIG. 3C. The ROI tracker 150 is configured to dynamically track instantaneous ROIs in a filming area of the studio 140. It should be noted that a single ROI tracker 150 serving all of the depth cameras 110 is shown in FIG. 1C merely for example purposes, and that multiple ROI trackers may be equally utilized without departing from the disclosed embodiments. The ROI trackers may be implemented in the depth cameras 110, or may be mounted separately from the depth cameras 110.

It should be noted that the example implementations shown in FIGS. 1A-1C are non-limiting, and that other numbers of depth cameras 110, projectors 120, ROI trackers 150, or a combination thereof, may be equally utilized consistent with the disclosed embodiments. Further, the FVV generator 130 may be remotely located and communicate with the depth cameras 110 over a network such as, but not limited to, a WAN, the Internet, and the like. In yet another embodiment, the processing as performed by the FVV generator 130 may be distributed among any or all of the various depth cameras 110.

Figure 2:
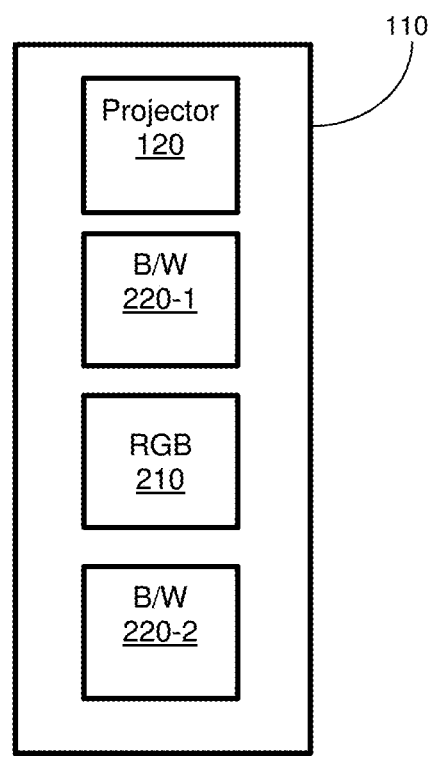
FIG. 2 is a schematic diagram of a depth camera utilized in the arrangement shown in FIG. 1B according to one embodiment.

FIG. 2 shows an example schematic diagram of the depth camera 110 according to an embodiment. The example depth camera 110 shown in FIG. 2 includes a RGB camera 210, B/W cameras 220-1 and 220-2, and a projector 120. Thus, in the implementation shown in FIG. 2, the projectors 120 are integrated in the depth cameras 110 as shown in FIG. 1B rather than separately from the depth cameras 110 as shown in FIG. 1A. Example schematic diagrams illustrating depth cameras 110 that do not include the projectors 120 are described further herein below with respect to FIGS. 3A-3C.

In the example implementation shown in FIG. 2, the depth camera 110 includes a pair of B/W cameras 220-1 and 220-2. Additionally, in the implementation shown in FIG. 2, the RGB camera 210 is placed between the B/W cameras 220.

In an embodiment, signals are captured by the RGB and B/W cameras of the depth cameras 110. Each of the depth cameras 110 produces a view point cloud, using signals reflected from the objects being illuminated by the projector 130. Specifically, a point cloud (or "local" point cloud) is generated based on signals captured by the B/W cameras 220-1 and 220-2. Specifically, the B/W cameras provide a depth per pixel or per feature, which may be viewed as a three-dimensional point per pixel or per feature. An example embodiment for generating a point cloud is described below.

In an embodiment, the point clouds produced from different depth cameras are unified, improved, and processed to reduce noise using samples from the RGB camera 210. In a further embodiment, the improvement is achieved using a passive triangulation. In another embodiment, the improvement may include a gating procedure. During the gating procedure, exposure of the RGB camera and the pulse emitted by the projector (including a laser source) are significantly shorter than 1 video frame time.

In addition, each depth camera 110 produces a high resolution RGB image, using the RGB camera 210, of a scene including a portion of the studio 140. The mesh generated from the unified point cloud is texturized using images captured by the RGB camera 210. That is, the 3D model is painted using textures captured by the RGB camera. The "painted" 3D model may be rendered from a viewpoint selected by, for example, a user such as a viewer or director. The viewpoint may be selected, for example, during post-processing. Additionally, a "continuous flight" experience is afforded. In this feature a continuously moving virtual camera provides frame-by-frame rendering, each frame from another viewpoint along a predetermined or currently specified path.

In another embodiment, the FVV rendering system disclosed herein allows for a director "cut", during the live broadcast from one virtual camera viewpoint to another. The location and pose of a virtual camera viewpoint may be predetermined or arbitrarily determined during the live broadcast.

Figure 3A:
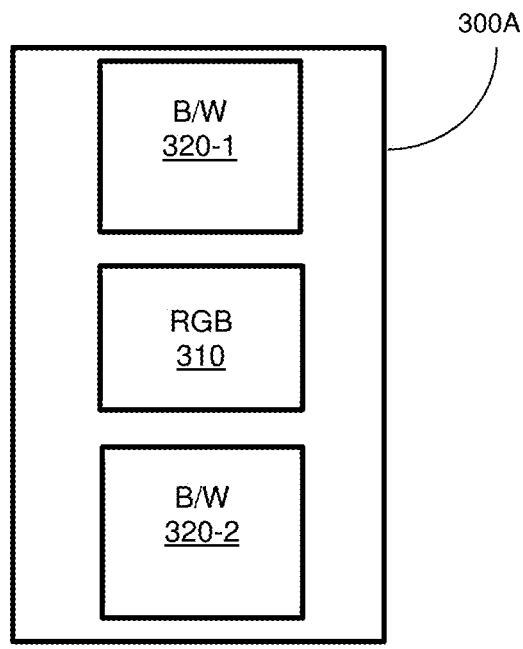
FIGS. 3A-3C are schematic diagrams of depth cameras utilized according to other embodiments.
Figure 3B:
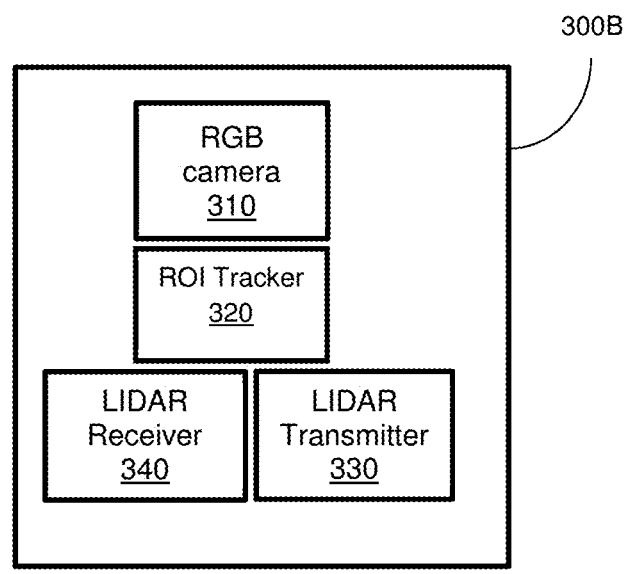
Figure 3C:
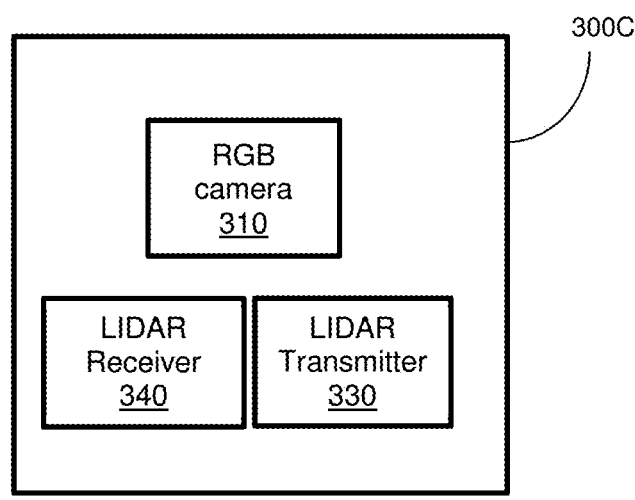

FIGS. 3A-3C are schematic diagrams of example depth cameras according to other embodiments. FIG. 3A shows an example depth camera 300A including a RGB camera 310 and a pair of B/W cameras 320-1 and 320-2. In the example implementation shown in FIG. 3A, the projectors 120 are not included in the depth camera 300A and, instead, are deployed in proximity to the studio 140 as shown in FIG. 1A. It should be noted that the embodiments disclosed herein are not limited to utilization of B/W cameras in the depth camera 110. Specifically, any optical sensing device or camera that can detect the projected features can be used without departing from the disclosed embodiments.

FIG. 3B shows an example depth camera 300B according to another embodiment. The camera 300B is utilized for generating FVVs in large areas, for example, where the range to the far end of the studio is typically 100-200 meters.

The depth camera 300B includes a RGB camera 310, a Region of Interest (ROI) tracking module (ROI Tracker) 320, a LIDAR scanner including a transmitter 330 and a receiver 340. The transmitter 330 and the receiver 340 may be mounted on a mechanical scanner unit (not shown). The module 340 is configured to dynamically identify and track the instantaneous ROIs on the pitch. Typically, in a broadcast production, the ROI would be around the subjects of the broadcast (e.g., people talking in a studio). The LIDAR scanner is configured to momentarily scan areas designated as ROIs by the module 340. The scanning is performed using a Time of Flight (TOF) technique. The LIDAR scanning results are utilized to create a point cloud (or point cloud) for the designated ROI at the current video frame.

Figure 4:
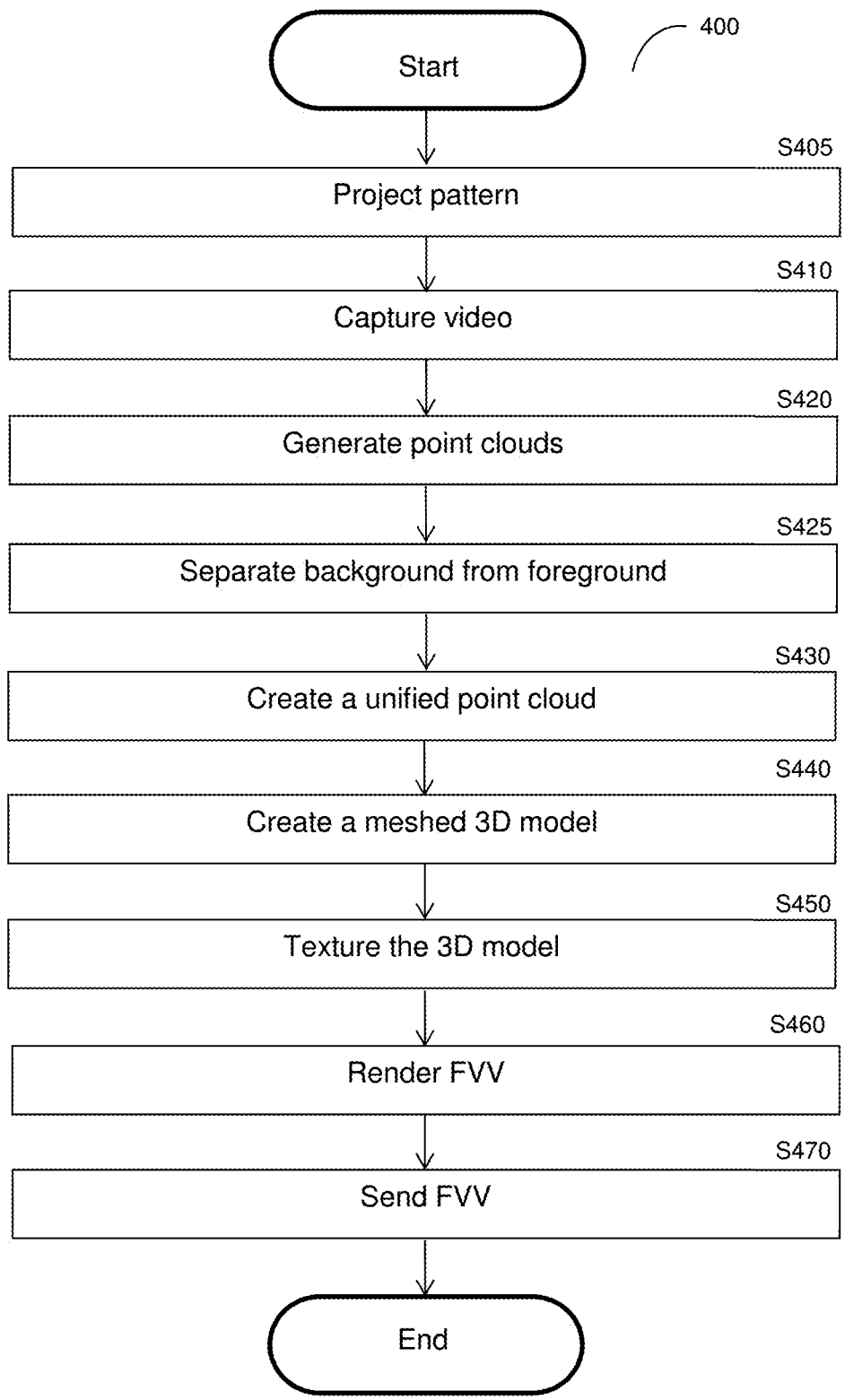
FIG. 4 is a flowchart illustrating a method for rendering free viewpoint videos in a broadcast studio according to an embodiment.

FIG. 4 is an example flowchart 400 illustrating a method for rendering FVVs according to an embodiment. In an embodiment, the method is performed by the FVV generator 130, FIGS. 1A-1C.

In an embodiment, prior to the execution of the method or upon an initial setting of the depth cameras in the studio, the depth cameras are calibrated. The calibration may include, but is not limited to, causing each depth cameras to synchronize on anchor points, identifying such anchor points, and calibrating each camera with respect to the other cameras using the identified points. The anchor points are points on an object placed in front of the cameras. The object may have a predefined pattern. For example, the object may include a checkerboard with squares arranged in alternating black and white colors. This type of calibration may be useful when the depth cameras are stationary.

Optionally, for non-stationary depth cameras, the calibration is performed using a dynamic calibration process. In some implementations, non-stationary depth cameras can be used for monitoring (tracking) of objects. The dynamic calibration is utilized to detect very small movements of the depth cameras (e.g., due to crowd cheering or vibrations). In an embodiment, the initial calibration points are registered. Then, during the dynamic calibration process, the locations of the initial calibration points are compared to newly detected calibrated points, and the calibration perturbation is computed respective thereof.

At S405, the projectors deployed in the studio are triggered to project a pattern onto objects in the studio. Each projected pattern includes a large set of features that are spatially unique. At S410, video is captured via the depth cameras. The video may include signals that were reflected off of objects and filtered by the B/W cameras (using their respective filters) and reflected ambient illumination captured by the RGB and B/W cameras.

At S420, a depth map or a "local" point cloud is generated based on signals reflected from the illuminated objects and captured by the pair of B/W cameras in each depth camera. A local point cloud is generated by measuring the distance for each feature as observed by the pair of B/W cameras. Each B/W camera, in a depth camera, would present the feature at a different pixel location, thus based on the known distance between the B/W cameras, the distance to the feature can be calculated. The various distances computed for the sets of features would create the point cloud and points cloud. It should be noted that the projected pattern typically includes millions of features. The output of S420 is point clouds ("local" point clouds) generated based on signals from each depth camera.

At S425, based on the generated point clouds, a separation between a background and foreground is performed. The separation may be performed based on a distance key defining the difference between foreground and background objects with respect to a distance from each depth camera. For example, when filming a news presenter behind a desk, the distance from each depth camera to the news presenter and to the desk can be determined by the distance key. The distance key may be a predetermined range of distances, and may be set by, for example, a user. For example, the range may define objects of interest as being above a first threshold distance but below a second threshold distance. Further, each point in the local point cloud has a 3D-location determined by a coordinate system (x, y, z) of the stage. The 3D-location (designated by the x, y, z coordinates) is determined as the distance from a respective depth camera that captured a respective point. Based on the distance key and the 3D locations of points, the separation can be achieved, and specifically separation of zones in the foreground from the background.

It should be noted that separation between foreground and background can be performed regardless of the specific method used to determine the 3D locations of points, as such separation is performed on zones or objects (which can be represented as "volumes" in the point cloud space). It should be further noted that separation does not require chromakeying and, thus, the studio does not need to include a green screen or blue screen to allow for distinguishing between foreground and background. The foreground may include one or more zones or objects of interest.

At S430, the various point clouds are unified into a single point cloud. This is performed using the information derived during the calibration process. That is, the various generated point clouds are merged with respect to the anchor points identified for each depth camera.

At S440, points in the united point cloud are meshed to create a 3D model. The 3D model represents a reconstructed scene (e.g., objects and their movement). To create the 3D model, the points of the unified point cloud are first meshed using a meshing process in key-frames for every frame. The meshing process may be performed using, for example, a Poisson mesh algorithm. The meshing process results with a meshed model (e.g., a polygon or triangle mesh), describing the surface of a model using, for example, triangles. Then, the movement of the meshed model is determined. This is performed by determining how the meshed model moves in the frames between two consecutive key-frames. The determination is based on the movement that best corresponds to a frame in the point cloud under continuity constraints.

In an embodiment, the movement of an object is defined with respect to its joints and its movement is being represented as the movement of the joints. In another embodiment, the created model ensures a high temporal resolution. To this end, tracking of the object's movement may be performed by frequently sampling times in which the object is substantially static (i.e., with little or no movement). An object may be substantially static if the movements of the object are below a predetermined threshold as determined with respect to, for example, a number of movements, distances moved, amount of rotation of joints, a combination thereof, and the like. The movement of the object can be predicted based on a current location and previous locations. Specifically, when the object is close to the camera, more details on the object can be learned, where such details are used to predict the movements of the object when it is far from the camera.

At S450, the meshed 3D model is textured. In an embodiment, each surface in the meshed model (or a triangle mesh) is mapped to one or more pixels in the RGB image captured by the RGB cameras. That is, S450 includes painting the meshed 3D model using textures captured by one or more RGB cameras with respect to the same surface or area. In some implementations, surfaces or areas not captured by the RGB cameras are painted based on considerations of continuity in time and space. That is, surfaces painted in the past will retain the same texture and areas adjacent to such surfaces may be assigned the same texture. The texture mapping can be achieved using conventional techniques discussed in the related art.

In a further embodiment, the texturing is different for the separated foreground and background objects. For example, the foreground objects may be textured using respective images captured by the RGB cameras, while the background objects may be textured using images uploaded from an external source. Accordingly, different background images may be substituted based on different distances rather than, for example, based on color. For example, a plain grey back wall of a broadcast studio behind the desk of a news anchor may be substituted with footage of the New York City skyline. As another example, a back wall of a broadcast studio may be substituted with, e.g., a weather map or traffic view during a weather or traffic report, respectively.

In yet a further embodiment, the substitution of backgrounds may include substituting 3D objects, thereby allowing for rendering the 3D environment onto the shooting camera viewpoint and generating a combined video. Thus, the background may be replaced with, for example, a background of another rendered FVV or a rendered 3D computer generated graphics environment.

Figure 5:
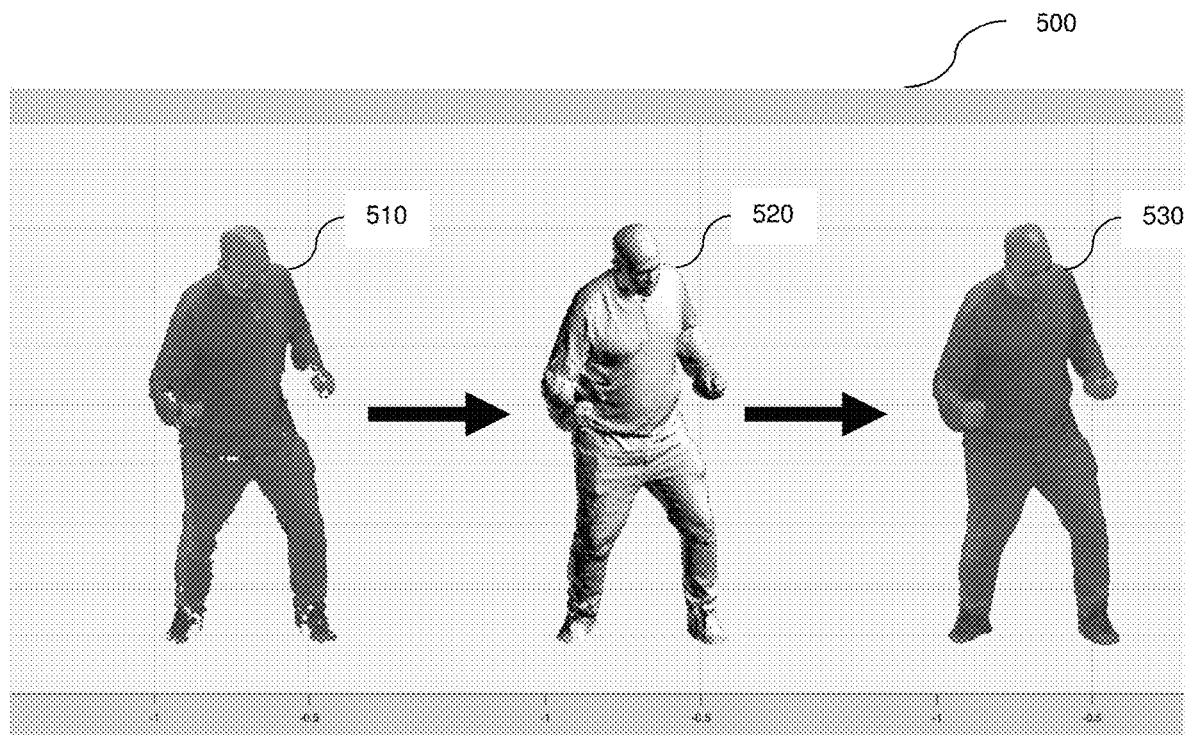
FIG. 5 shows example illustrations demonstrating various stages during the process for generating FVVs.

FIG. 5 shows example illustrations demonstrating various stages during the process for generating FVVs in accordance with at least some of the embodiments described in FIG. 4. The example implementation shown in FIG. 5 illustrates creation of a textured model 530 from a unified point cloud (visually represented as 510) via a meshed 3D model 520. The point cloud 510 is generated based on inputs from the B/W cameras. The 3D model 520 is created by meshing the points in the point cloud 510. The meshed 3D model 520 is textured using texture mapping based on images from the RGB cameras to create the textured model 530.

Returning to FIG. 4, at S460, the textured 3D model is rendered as a series of video frames from a viewpoint, thereby providing footage from a virtual camera. The rendered video is a FVV that can be displayed or edited using the various applications discussed herein below. Various examples are discussed herein.

At S470, the FVV is sent to one or more recipient devices. The recipient devices may be, for example, data sources (e.g., data sources storing content for delivery to user devices), user devices, and the like. The user devices may be, but are not limited to, smart televisions, tablet computers, smartphones, laptop computers, desktop computers, VR headset, and other devices configured for receiving and displaying FVVs. In an embodiment, S470 may include uploading the FVV to one or more servers (e.g., one or more content hosting servers accessible over the Internet or other networks). The uploaded FVV may be downloaded by users via user devices by accessing the data sources. In another embodiment, the FVV can be uploaded or transmitted to a control system in a production control room or studio control room.

In an embodiment, the FVV may be sent for display with respect to a user interface on a user device. The user interface may have selectable options for FVVs, for example, predetermined virtual cameras (i.e., viewpoints including predetermined combinations of angles and positions) that the user may select from. The selectable options may further include predetermined camera movements (e.g., pan, zoom, predetermined camera locations, virtual fly trajectory, etc.) that the generated FVV should include. When a FVV option is selected, a FVV meeting the option may be generated and sent to the user device.

In various implementations, the FVV may be displayed along with sound simulated from the location at which the FVV was captured. In an embodiment, the sound may be changed based on the viewpoint of the FVV. For example, the sound used may be different depending on the viewing angle of the FVV. Changing the sound may include, for example, synthesizing the sound from microphones located, for example, a closest angle, location, or both, to the selected virtual camera's angle and location). In another implementation, changing the sound may include modifying sound parameters (i.e., pitch, tone, loudness, etc.), both, and the like.

In some implementations, an artificial intelligence (AI) program may be trained to act as a "virtual cameraman" that selects virtual cameras based on, for example, a type of activity occurring in the filming location (e.g., based on a current speaker), a location of the activity (e.g., a marked location in the studio), a time of the event (e.g., predetermined commercial break time), a combination thereof, and the like. The AI program may be trained based on historical selections made by users (e.g., directors) during previous filming.

In an embodiment, S470 may further include compressing the rendered FVV to allow efficient transportation via a network (e.g., the Internet) and, in particular, to increase speed for real-time transmission of the FVV. In an embodiment, the compression ratio is high for areas with low interest and the compression ratio is low for areas with high interest. To this end, in an embodiment, S470 may include determining whether each portion of the FVV is of high interest or of low interest. Rules for determining whether a portion is high or low interest may be predefined with respect to, for example, background versus foreground, predetermined features of interest (e.g., certain body parts or objects), both, and the like.

In some embodiments, human poses (skeletons) can be detected based on the RGB images, the point cloud, or both. A detected skeleton can be utilized to improve or adjust the meshing process, adjust the movement of the model by assigning degrees freedom to known joints, and adjusting compression ratio for features of interest.

Figure 7:
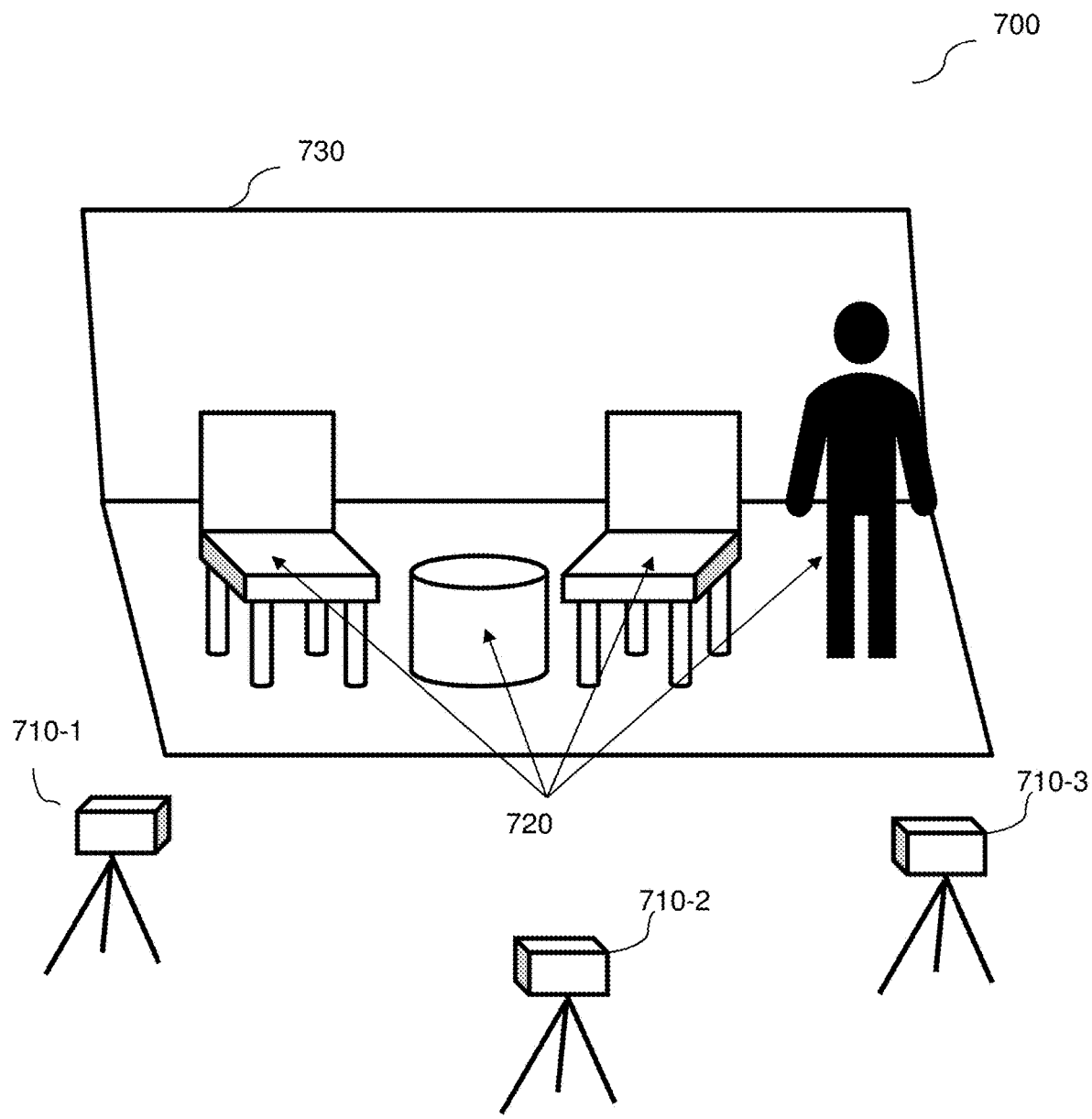
FIG. 7 is a schematic diagram illustrating a studio.

FIG. 7 is an example schematic diagram of a studio 700 including depth cameras 710-1 and 710-2 (hereinafter referred to individually as a depth camera 710 and collectively as depth cameras 710, merely for simplicity purposes) configured according to various disclosed embodiments. In the example implementation, the studio 700 includes various objects 720 between a background 730 and the depth cameras 710. Each depth camera 710 includes at least a projector, a B/W camera and a RGB camera (not shown in FIG. 7). The B/W camera is configured to capture signals reflected off of the objects 720 after being projected by the projectors. The RGB camera is configured to capture color signals to be utilized to texture 3D models created based on the signals captured by the B/W camera.

It should be noted that the studio 700 does not include a chromakeying aid such as a green screen or blue screen. The disclosed embodiments allow for substituting images of the background 730 with pre-captured images. Specifically, foreground/background separation is performed based on the captured B/W signals, thereby allowing for substitution of appropriate portion of pre-captured images with the separated background portion. Accordingly, no green screen or blue screen is needed to provide substituted background footage.

Figure 8:
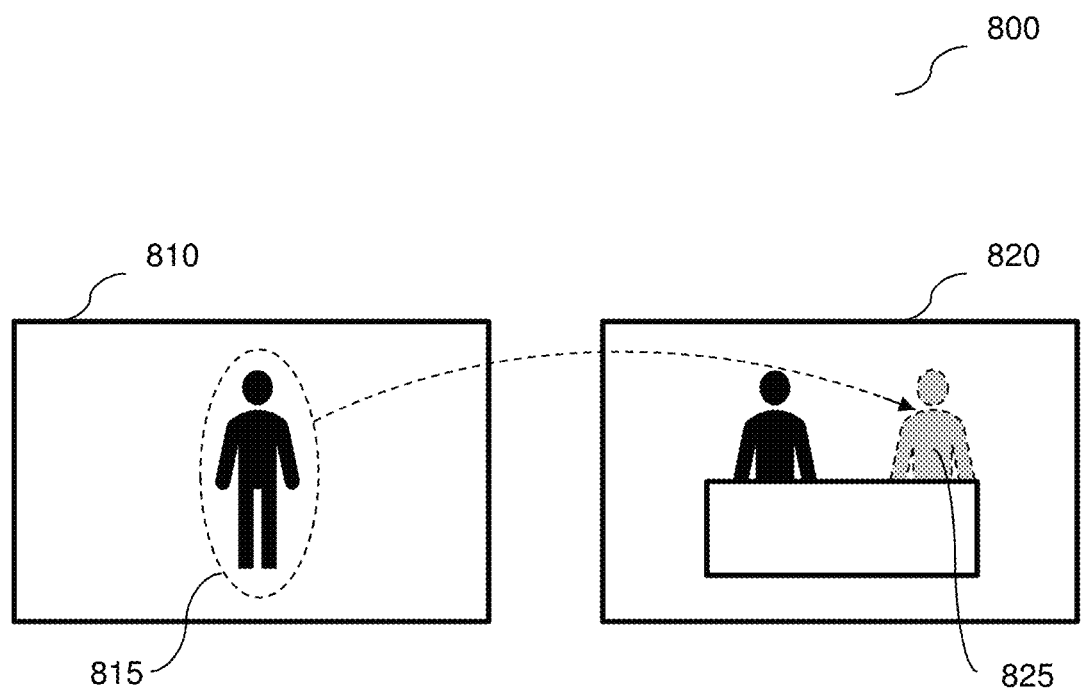
FIG. 8 is an illustration showing an example implementation of a teleportation process.

FIG. 8 is an illustration 800 showing an example implementation of a teleportation process. In the example illustration 800, a volumetric video of a person 815 in a first location 810 is captured and a 3D model is created based thereon, for example as described herein. The volumetric video of the person 815 may be separated from the background in the first location (e.g., studio) 810 using the foreground-background separation discussed herein above.

In the example implementation shown in FIG. 8, the volumetric video of the person 815 is a person to be shown in footage of a talk show recorded at a different location, a second location 820. To this end, the volumetric video of the person 815 is transmitted in real-time to the second location 820 (e.g., a remote studio). In the second location 820, the volumetric video of the person 815 is rendered and displayed as a volumetric video 825, which is a 3D object. The cameras (not shown) in the second location can film the volumetric video 825 from any angle. As the teleportation is performed in real-time, the person 827 can interact with the person 815 in the first location 810 as if that person is physically located in the second location 820. The second location 820 may be a "standard" TV studio that does not include the production system, disclosed herein.

In another embodiment, location and pose parameters of a camera shooting at the second location 820 may be transmitted in real-time to the first location 810. The location and pose parameters collectively define a viewpoint of the camera in the second location 820. The volumetric video of the person 815 in the first location 810 is rendered in the viewpoint of the camera in the second location 820 based on the received location and pose parameters, and a video showing the person 815 from the viewpoint is transmitted to the second location 820.

In some implementations, FVVs or portions thereof may be uploaded to a FVV repository, or FVV library, containing a collection of different FVVs. The FVVs in the repository may be downloaded and displayed on, for example, user devices such as smart phones, AR headsets, VR headsets, volumetric video projectors, and the like. The uploaded FVVs may allow for insertion of prerecorded visual reproductions of athletes, performers, celebrities, and the like, into users' videos. Accordingly, users may be allowed to select models of their choice for insertion into videos. Further, FVVs or portions thereof may be inserted into 3D videos (e.g., FVVs created as described herein) to create a unified 3D video. For example, a user may insert footage showing celebrity chef Gordon Ramsey into a video of the user cooking to create a unified video of the user cooking alongside Gordon Ramsey. As another example, footage showing a giraffe may be inserted into video captured by an AR headset while a user is playing an AR game.

Given the depth per pixel produced according to the disclosed embodiments, the number of depth cameras deployed at a filming location may be significantly reduced as compared to existing solutions. Thus, 2 to 16 depth cameras may be utilized as opposed to, for example, man-operated cameras with such as cranes and cameras mounted on studio camera pedestals. Additionally, the number of computing components (e.g., servers, communication components, and other accessories) and the amount of computing resources required by those computing components to process the data is reduced. Thus, the disclosed embodiments allow for simpler installation and less expensive operation of depth cameras. Furthermore, the FVV rendered by the disclosed embodiments are higher quality than existing solutions.

Further, for studio production of VR videos, the number of depth cameras deployed at a filming location may be significantly reduced as compared to existing solutions. For example, 2 depth cameras may be utilized as opposed to, for example, tens of cameras as utilized in the existing solutions. Further, the depth cameras do not need to be moved during filming, as "movement" of the cameras (e.g., pan, changing elevation, zoom, etc.) may be simulated by switching among virtual cameras. Thus, the disclosed embodiments may provide simulated rig movements, i.e., a series of viewpoints that simulate movement of devices such as dollies and cranes. Moreover, the disclosed embodiments allow for background editing without a blue screen or green screen, markers, or both. Also, video quality may be greatly improved with respect to, for example, more accurate substitution of background images, and the like.

Additionally, the disclosed embodiments allow for calculation and rendering of the FVV in real-time within seconds of capturing signals used to produce the FVVs. As such, views for VR, AR, or volumetric video applications may be provided in real-time in response to movements of a viewer, in contrast to existing solutions, which may require a duration of tens of seconds or even minutes to produce a volumetric video, a VR view, or an AR view. Moreover, real-time rendering allows the director to select, in live broadcast, the viewpoint (or virtual camera) and to produce a broadcast from multiple virtual cameras placed at will. The director can also decide on the location of the virtual camera at a certain point of interest based on the occurrence. The virtual cameras therefore can provide a video of an event from any desired viewpoint.

FVVs created using the disclosed embodiments may have a large number of potential viewpoints using a low number of simple and relatively inexpensive cameras. This allows for lower costs with respect to installation and maintenance as compared to some existing solutions. The created FVVs may be utilized to provide, for example, production suite for studio broadcasts, or for reproducing footage for VR, AR, and volumetric video applications.

In another embodiment, the generated FVVs or 3D model can be uploaded to a cloud-based FVV library. This allows a user to select from the library, download, or view FVVs. The user can view the FVVs over a VR headset, AR headset, or a smartphone configured with AR capabilities.

Figure 6:
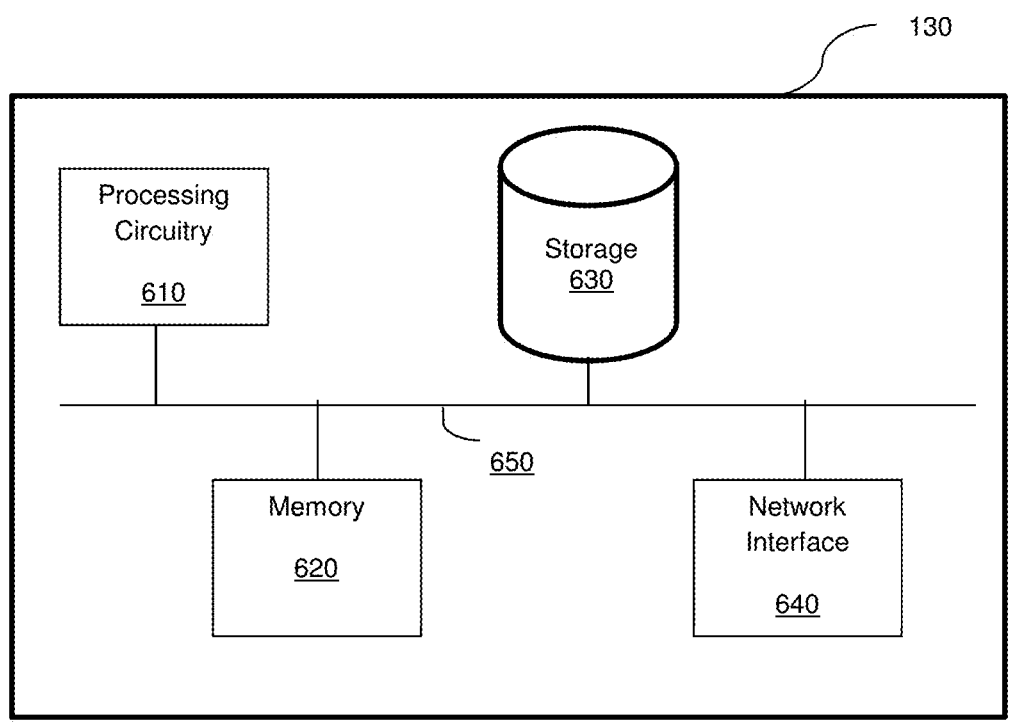
FIG. 6 is a schematic diagram of a FVV generator according to an embodiment.

FIG. 6 is an example schematic diagram of the FVV generator 130 according to an embodiment. The FVV generator 130 includes a processing circuitry 610 coupled to a memory 620, a storage 630, and a network interface 640. In another embodiment, the components of the FVV generator 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, configure the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the FVV generator 130 to communicate with the depth cameras 110, one or more user devices, one or more servers hosting recorded FVV content, or a combination thereof, for purposes such as receiving inputs from depth cameras, sending FVV renders for display, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination thereof. The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

What is claimed is:

1. A method for studio production of a free viewpoint video (FVV), comprising:
   projecting, onto objects in a filming area within a studio, a predefined pattern including a large set of features;
   generating, based on signals captured by each of a plurality of depth cameras, a local point cloud for each depth camera, wherein the plurality of depth cameras is deployed in proximity to the filming area, wherein the captured signals are reflections off of the objects within the filming area of the projected features of the predefined pattern and are distinct from a red-green-blue (RGB) image captured by each respective one of the depth cameras;
   separating, based on depth information contained in the plurality of local point clouds, between objects of a background and objects of a foreground of the filming area of the studio based on a distance key defining a difference between ones of the foreground objects and ones of the background objects with respect to a distance from each depth camera;
   creating, based on the plurality of local point clouds, a unified point cloud;
   meshing points in the unified point cloud to generate a three-dimensional (3D) model of the objects;
   texturing the 3D model based on the separation and the RGB images captured by the plurality of depth cameras; and
   rendering the textured 3D model as a FVV including a series of video frames with respect to at least one viewpoint;
   wherein the textured 3D model is a volumetric video at a first location that is teleported to a second location in real-time so that by virtue of the teleportation the volumetric video as rendered as the FVV appears to be integrated into frames of a video showing the second location, wherein the textured 3d model is rendered at an angle with respect to the frames of the video of the second location such that the FVV from the first location is at a viewpoint matching that of a camera that captured the frames of the video of the second location;
   wherein the foreground is textured based on signals captured by the plurality of depth cameras, wherein the background is textured based on at least one other image, wherein the projecting projects light onto objects in a filming area so that the projecting and generating together implement active depth measurement based on the projected light; and
   wherein the foreground is a zone of interest containing foreground objects and wherein the background may include background objects that are located in front of objects of the foreground from the perspective of at least one of the depth cameras.

2. The method of claim 1, wherein the plurality of local point clouds includes a plurality of points, wherein each point has a 3D location determined based on the distance from a respective depth camera of the plurality of depth cameras, wherein the separation is based on the distance key and the 3D locations of the points.

3. The method of claim 1, wherein each depth camera is a stationary camera.

4. The method of claim 1, further comprising:
   transmitting a video to a second location, wherein the video transmitted to the second location is created by rendering the textured 3D model based on at least one location parameter and at least one pose parameter.

5. The method of claim 1, further comprising:
   uploading the FVV to a cloud-based FVV repository, wherein the FVV is displayed on a user device when the user device downloads the FVV from the FVV repository.

6. The method of claim 5, wherein the user device is at least one of: an augmented reality (AR) headset, a virtual reality (VR) headset, and a smartphone.

7. The method of claim 1, wherein each depth camera comprises:
   a pair of pattern sensing cameras for capturing the reflected signals and a red-green-blue (RGB) camera for capturing the images utilized for the texturing.

8. The method of 1, further comprising:
   compressing the FVV based on a compression ratio, wherein the compression ratio is high for areas of low interest, wherein the compression area is low for areas of high interest.

9. The method of claim 1, further comprising:
   automatically selecting the at least one viewpoint based on a trained artificial intelligence (AI) model, the viewpoint being selected substantially concurrently with the rendering of the FVV as the series of video frames and the AI model having been trained based on historical selections made by at least one user during previous production of a previous FVV.

10. The method of claim 1, wherein the at least one viewpoint simulates at least one camera movement.

11. The method of claim 1, wherein the at least one viewpoint is selected in post processing after capturing of the signals by the plurality of depth cameras.

12. A non-transitory computer readable medium having stored thereon instructions for causing a processing circuitry to execute the method of claim 1.

13. A method for studio production of a free viewpoint video (FVV), comprising:
   projecting, onto objects in a filming area within a studio, a predefined pattern including a large set of features;
   generating, based on signals captured by each of a plurality of depth cameras, a local point cloud for each depth camera, wherein the plurality of depth cameras is deployed in proximity to the filming area, wherein the captured signals are reflections off of the objects within the filming area of the projected features of the predefined pattern and are distinct from a red-green-blue (RGB) image captured by each respective one of the depth cameras;

separating, based on depth information contained in the plurality of local point clouds, between objects of a background and objects of a foreground of the filming area of the studio based on a distance key defining a difference between ones of the foreground objects and ones of the background objects with respect to a distance from each depth camera;

creating, based on the plurality of local point clouds, a unified point cloud;

meshing points in the unified point cloud to generate a three-dimensional (3D) model of the objects;

texturing the 3D model based on the separation and the RGB images captured by the plurality of depth cameras; and rendering the textured 3D model as a FVV including a series of video frames with respect to at least one viewpoint;

wherein the textured 3D model is a volumetric video at a first location that is teleported to a second location in real-time so that by virtue of the teleportation the volumetric video as rendered as the FVV appears to be integrated into frames of a video showing the second location, wherein the textured 3d model is rendered at an angle with respect to the frames of the video of the second location such that the FVV from the first location is at a viewpoint matching that of a camera that captured the frames of the video of the second location;

wherein the foreground is textured based on signals captured by the plurality of depth cameras, wherein the background is rendered based on a three-dimensional environment, wherein the projecting projects light onto objects in a filming area so that the projecting and generating together implement active depth measurement based on the projected light; and wherein the foreground is a zone of interest containing foreground objects and wherein the background may include background objects that are located in front of objects of the foreground from the perspective of at least one of the depth cameras.

14. A non-transitory computer readable medium having stored thereon instructions for causing a processing circuitry to execute the method of claim 13.

15. A system for studio production of a free viewpoint video (FVV), comprising:

a processing circuitry; and a memory, the memory containing instructions that, when executed by the processing circuitry, configure the system to:

project, onto objects in a filming area within a studio, a predefined pattern including a large set of features;

generate, based on signals captured by each of a plurality of depth cameras, a local point cloud for each depth camera, wherein the plurality of depth cameras is deployed in proximity to the filming area, wherein the captured signals are reflections off of the objects within the filming area of the projected features of the predefined pattern and are distinct from a red-green-blue (RGB) image captured by each respective one of the depth cameras;

separate, based on depth information contained in the plurality of local point clouds, between objects of a background and objects of a foreground of the filming area of the studio based on a distance key defining a difference between ones of the foreground objects and ones of the background objects with respect to a distance from each depth camera;

create, based on the plurality of local point clouds, a unified point cloud;

mesh points in the unified point cloud to generate a three-dimensional (3D) model of the objects;

texture the 3D model based on the separation and the RGB images captured by the plurality of depth cameras; and render the textured 3D model as a FVV including a series of video frames with respect to at least one viewpoint;

wherein the textured 3D model is a volumetric video at a first location that is teleported to a second location in real-time so that by virtue of the teleportation the volumetric video as rendered as the FVV appears to be integrated into frames of a video showing the second location, wherein the textured 3d model is rendered at an angle with respect to the frames of the video of the second location such that the FVV from the first location is at a viewpoint matching that of a camera that captured the frames of the video of the second location;

wherein the foreground is textured based on signals captured by the plurality of depth cameras, wherein the background is textured based on at least one other image, wherein the projecting projects light onto objects in a filming area so that the projecting and generating together implement active depth measurement based on the projected light; and wherein the foreground is a zone of interest containing foreground objects and wherein the background may include background objects that are located in front of objects of the foreground from the perspective of at least one of the depth cameras.

16. The system of claim 15, wherein the plurality of local point clouds includes a plurality of points, wherein each point has a 3D location determined based on the distance from a respective depth camera of the plurality of depth cameras, wherein the separation is based on the distance key and the 3D locations of the points.

17. The system of claim 15, wherein each depth camera is a stationary camera.

18. The system of claim 15, wherein the textured 3D model is a volumetric video at a first location and transmitted to a second location in real-time.

19. The system of claim 15, wherein the system is further configured to:

transmit a video to a second location, wherein the video transmitted to the second location is created by rendering the textured 3D model based on at least one location parameter and at least one pose parameter.

20. The system of claim 15, wherein the system is further configured to:

upload the FVV to a cloud-based FVV repository, wherein the FVV is displayed on a user device when the user device downloads the FVV from the FVV repository.

21. The system of claim 20, wherein the user device is at least one of: an augmented reality (AR) headset, a virtual reality (VR) headset, and a smartphone.

22. The system of claim 15, wherein each depth camera comprises:

a pair of pattern sensing cameras for capturing the reflected signals and a red-green-blue (RGB) camera for capturing the images utilized for the texturing.

23. The system of 15, wherein the system is further configured to:

compress the FVV based on a compression ratio, wherein the compression ratio is high for areas of low interest, wherein the compression area is low for areas of high interest.

24. The system of claim 15, wherein the system is further configured to:
automatically select the at least one viewpoint based on a trained artificial intelligence (AI) model, the viewpoint being selected substantially concurrently with the rendering of the FVV as the series of video frames and the AI model having been trained based on historical selections made by at least one user during previous production of a previous FVV.

25. The system of claim 15, wherein the at least one viewpoint simulates at least one camera movement.

26. The system of claim 15, wherein the at least one viewpoint is selected in post processing after capturing of the signals by the plurality of depth cameras.

27. A system for studio production of a free viewpoint video (FVV), comprising:
a processing circuitry; and
a memory, the memory containing instructions that, when executed by the processing circuitry, configure the system to:
project, onto objects in a filming area within a studio, a predefined pattern including a large set of features;
generate, based on signals captured by each of a plurality of depth cameras, a local point cloud for each depth camera, wherein the plurality of depth cameras is deployed in proximity to the filming area, wherein the captured signals are reflections off of the objects within the filming area of the projected features of the predefined pattern and are distinct from a red-green-blue (RGB) image captured by each respective one of the depth cameras;
separate, based on depth information contained in the plurality of local point clouds, between objects of a background and objects of a foreground of the filming area of the studio based on a distance key defining a difference between ones of the foreground objects and ones of the background objects with respect to a distance from each depth camera;
create, based on the plurality of local point clouds, a unified point cloud;
mesh points in the unified point cloud to generate a three-dimensional (3D) model of the objects;
texture the 3D model based on the separation and the RGB images captured by the plurality of depth cameras; and
render the textured 3D model as a FVV including a series of video frames with respect to at least one viewpoint;
wherein the textured 3D model is a volumetric video at a first location that is teleported to a second location in real-time so that by virtue of the teleportation the volumetric video as rendered as the FVV appears to be integrated into frames of a video showing the second location, wherein the textured 3d model is rendered at an angle with respect to the frames of the video of the second location such that the FVV from the first location is at a viewpoint matching that of a camera that captured the frames of the video of the second location;
wherein the foreground is textured based on signals captured by the plurality of depth cameras, wherein the background is rendered based on a three-dimensional environment, wherein the projecting projects light onto objects in a filming area so that the projecting and generating together implement active depth measurement based on the projected light; and
wherein the foreground is a zone of interest containing foreground objects and wherein the background may include background objects that are located in front of objects of the foreground from the perspective of at least one of the depth cameras.

* * * * *